US012705839B2

(12) United States Patent
Qiu

(10) Patent No.: US 12,705,839 B2
(45) Date of Patent: Aug. 11, 2026

(54) INTERACTIVE CONTROL METHOD, TERMINAL DEVICE AND STORAGE MEDIUM

(71) Applicant: GOERTEK INC., Shandong (CN)

(72) Inventor: Xudong Qiu, Shandong (CN)

(73) Assignee: GOERTEK INC., Shandong (CN)

( * ) Notice: Subject to any disclaimer, the term of this patent is extended or adjusted under 35 U.S.C. 154(b) by 190 days.

(21) Appl. No.: 18/556,179

(22) PCT Filed: Dec. 15, 2021

(86) PCT No.: PCT/CN2021/138415

§ 371 (c)(1), (2) Date: Oct. 19, 2023

(87) PCT Pub. No.: WO2022/222510

PCT Pub. Date: Oct. 27, 2022

(65) Prior Publication Data

US 2024/0221326 A1 Jul. 4, 2024

(30) Foreign Application Priority Data

Apr. 20, 2021 (CN) ......................... 202110422743.8

(51) Int. Cl.

*G06T 19/00* (2011.01)
*G06F 3/01* (2006.01)
*G06V 10/46* (2022.01)
*G06V 10/60* (2022.01)

(52) U.S. Cl.

CPC ............ *G06T 19/006* (2013.01); *G06F 3/017* (2013.01); *G06V 10/46* (2022.01); *G06V 10/60* (2022.01)

(58) Field of Classification Search

CPC ....... G06T 19/006; G06T 17/00; G06F 3/017; G06F 3/011; G06F 3/0484; G06F 3/167; G06F 2203/012; G06F 2203/04802; G06V 10/46; G06V 10/60; G06V 20/20

See application file for complete search history.

(56) References Cited

U.S. PATENT DOCUMENTS 8,502,780 B1 * 8/2013 Park .................... G06F 3/04886 345/165
8,938,124 B2 * 1/2015 Eilat ...................... G06V 40/28 382/195
9,612,655 B2 * 4/2017 Mueller .................... G06T 7/75

(Continued)

FOREIGN PATENT DOCUMENTS

CN 103946734 A 7/2014
CN 108921101 A 11/2018

(Continued)

*Primary Examiner* — Motilewa Good-Johnson

(74) *Attorney, Agent, or Firm* — Ingrassia Fisher & Lorenz, LLP

(57) ABSTRACT

An interactive control method is disclosed. The interactive control method comprises the steps of: acquiring image data collected by the camera; determining a current scene and a control gesture according to the image data; and when the current scene is a control scene corresponding to the terminal device, executing a control instruction corresponding to the control gesture. A terminal device and a computer-readable storage medium are also disclosed. The effect of improving the accuracy of control input detection of the terminal device is achieved.

10 Claims, 3 Drawing Sheets

(56) References Cited

U.S. PATENT DOCUMENTS 9,785,247 B1 * 10/2017 Horowitz ............. G06V 40/113
10,186,086 B2 * 1/2019 Giraldi ................ G06F 3/04842
10,216,312 B2 * 2/2019 Park ....................... H04N 23/45
10,281,987 B1 * 5/2019 Yang ..................... G06F 3/0426
10,338,673 B2 * 7/2019 Chen ...................... G06V 40/10
10,353,532 B1 * 7/2019 Holz ................... G06F 3/04847
10,540,941 B2 * 1/2020 Day ........................ G06F 3/011
10,656,720 B1 * 5/2020 Holz ....................... G06F 3/017
10,671,842 B2 * 6/2020 Chen ...................... G06V 10/25
11,054,894 B2 * 7/2021 Pahud ................... G06F 3/0304
11,782,590 B2 * 10/2023 Huang ................ H04L 12/2823 715/735
11,841,920 B1 * 12/2023 Marsden ................ G06N 3/045
11,934,735 B2 * 3/2024 Woo ........................ G06F 3/147
12,307,803 B2 * 5/2025 Koo ........................ G06F 3/017
12,340,025 B2 * 6/2025 Armstrong .............. G06F 3/017
12,340,615 B2 * 6/2025 Huang ................... G06V 40/28
2005/0134117 A1 * 6/2005 Ito ........................... G06F 3/017 307/10.1
2010/0118158 A1 * 5/2010 Boland .................. H04N 23/63 348/376
2010/0245585 A1 * 9/2010 Fisher ................... G06F 1/1686 348/240.99
2011/0254964 A1 * 10/2011 Zhang ................... G03B 17/02 348/207.1
2014/0007022 A1 * 1/2014 Tocino Diaz .......... G06V 40/28 715/863
2014/0101604 A1 * 4/2014 Han ...................... G06F 3/0487 715/781
2014/0184801 A1 * 7/2014 Choi ...................... H04N 7/185 348/158
2014/0267142 A1 * 9/2014 MacDougall ........... G06F 3/044 345/174
2016/0044298 A1 * 2/2016 Holz ..................... G06T 19/006 348/47
2016/0140763 A1 * 5/2016 Seichter .............. G06F 3/04812 345/633
2017/0061694 A1 * 3/2017 Giraldi ...................... G06F 3/16
2019/0033988 A1 * 1/2019 Hesch ................... G06F 3/0346
2019/0107894 A1 4/2019 Hebbalaguppe et al.
2019/0237044 A1 8/2019 Day et al.
2019/0294870 A1 * 9/2019 Xie ...................... G02B 27/017
2020/0012351 A1 * 1/2020 Zhao ...................... G06V 40/28
2020/0183556 A1 * 6/2020 Liu ......................... G06F 3/011
2020/0249825 A1 * 8/2020 Chen ....................... G06T 11/60
2021/0090315 A1 * 3/2021 Gladkov ............. G06F 9/45512
2021/0149558 A1 * 5/2021 Qian ................... G06F 3/04845
2022/0057927 A1 * 2/2022 Huang ................ G06F 3/04847
2022/0075453 A1 * 3/2022 Huang ...................... G06T 7/74
2022/0291755 A1 * 9/2022 Lu .......................... G06V 40/28
2023/0093983 A1 * 3/2023 Fang ......................... G06T 7/70 345/156
2023/0130770 A1 * 4/2023 Miller .................... G06N 20/00 345/156
2023/0214025 A1 * 7/2023 Lessman ................. G06F 3/011 345/156
2023/0341947 A1 * 10/2023 Komiyama .......... H04N 23/611
2023/0342958 A1 * 10/2023 Kempf .................... G06T 7/521
2024/0028130 A1 * 1/2024 Liu ..................... G06F 3/04815
2024/0192766 A1 * 6/2024 Furtwangler ........... G06F 3/011
2024/0221326 A1 * 7/2024 Qiu ........................ G06V 20/20
2024/0273597 A1 * 8/2024 Scully ..................... G06F 3/017
2025/0182425 A1 * 6/2025 Mu ......................... G06F 3/011
2025/0217572 A1 * 7/2025 DeCharms ............ G06F 40/197
2025/0217946 A1 * 7/2025 Singh ..................... G06V 10/44

FOREIGN PATENT DOCUMENTS

CN 110221690 A 9/2019
CN 111052042 A 4/2020
CN 111580652 A 8/2020
CN 111950521 A 11/2020
CN 113010018 A 6/2021

* cited by examiner

INTERACTIVE CONTROL METHOD, TERMINAL DEVICE AND STORAGE MEDIUM

CROSS-REFERENCE TO RELATED APPLICATIONS

This Application is a U.S. National-Stage entry under 35 U.S.C. § 371 based on International Application No. PCT/CN2021/138415, filed Dec. 15, 2021 which was published under PCT Article 21(2) and which claims priority to Chinese Application No. 202110422743.8, filed Apr. 20, 2021, which are all hereby incorporated herein in their entirety by reference.

TECHNICAL FIELD

This application pertains to the technical field of gesture control, in particular to an interactive control method, a terminal device and a computer-readable storage medium.

BACKGROUND

Augmented reality (AR) is a technology that ingeniously integrates virtual information with the real world. It extensively uses various technical means such as multimedia, three-dimensional modeling, real-time tracking and registration, intelligent interaction, and sensing to simulate the virtual information generated by the AR device, such as words, images, three-dimensional models, music and videos, and apply them to the real world. The two kinds of information complement each other, thereby realizing the "augmentation" or "enhancement" of the real world.

In related technologies, the most common control solution for AR devices is gesture control, that is, users can perform human-computer interaction with the AR device through gestures, thereby controlling the displayed content of the AR device. However, when the AR device is controlled by gestures, the AR device will execute the control commands corresponding to all the collected gestures, which often leads to the phenomenon of false identification in some application scenarios. For example, when a user using an AR device simultaneously uses other electronic devices such as a mobile phone and a tablet computer, the AR device may mistakenly identify the user's gesture for controlling other electronic devices as the user's gesture for controlling the AR device.

As a result, the input detection solution of AR devices in the related technologies has the defect that the control input detection of AR devices is not accurate.

The above content is only used to assist the understanding of the technical solutions of the present disclosure, and does not mean that the above content is acknowledged as the prior art. In addition, other objects, desirable features and characteristics will become apparent from the subsequent summary and detailed description, and the appended claims, taken in conjunction with the accompanying drawings and this background.

SUMMARY

The main object of the present disclosure is to provide an interactive control method, a terminal device and a computer-readable storage medium so as to achieve the effect of improving the accuracy of control input detection of the terminal device.

In order to achieve the above object, the present disclosure provides an interactive control method, which comprises the steps of:

acquiring image data collected by the camera;

determining a current scene and a control gesture according to the image data; and when the current scene is a control scene corresponding to the terminal device, executing a control instruction corresponding to the control gesture.

Optionally, after the step of determining the current scene and the control gesture according to the image data, the method further comprises:

when the current scene is a scene other than the control scene, the terminal device ignores the control gesture, or performs at least one of the following:

displaying a prompt interface, wherein the prompt interface is used to set a type of the control gesture; and outputting a prompt message prompting a type of the control gesture.

Optionally, the step of determining the current scene and the control gesture according to the image data comprises:

identifying whether an electronic device is included in the image data;

determining whether the current scene is the control scene according to an identification result; and determining the control gesture according to the image data.

Optionally, the interactive control method further comprises:

when the electronic device is included in the image data, determining whether a hand part in the image data overlaps with the electronic device; and when the hand part overlaps with the electronic device, defining the current scene as a scene other than the control scene.

Optionally, the step of identifying whether the electronic device is included in the image data comprises:

acquiring brightness values corresponding to every pixel in the image data;

acquiring a contour corresponding to a display region in which the brightness values satisfy a preset condition; and when the contour is of a regular shape, determining that the electronic device is included in the image data.

Optionally, the terminal device is an augmented reality device, and the step of executing the control instruction corresponding to the control gesture comprises:

collecting posture information and hand part information corresponding to the image data;

performing three-dimensional dense modeling according to the posture information and the hand part information to acquire three-dimensional point cloud information of the hand part in a reference coordinate system;

acquiring pose information of a virtual object in the image data in the reference coordinate system; and rendering the hand part and the virtual object based on the three-dimensional point cloud information of the hand part in the reference coordinate system and the pose information of the virtual object in the reference coordinate system, so as to execute the control instruction corresponding to the control gesture.

Optionally, the step of collecting the posture information and the hand part information corresponding to the image data comprises:

collecting an RGB image, a depth image and IMU data of the image data; and processing the RGB image, depth image and IMU data to acquire the posture information and the hand part information corresponding to the image data.

Optionally, the terminal device is a smart earphone, and the step of executing the control instruction corresponding to the control gesture comprises:

acquiring a hand part contour corresponding to the control gesture; and acquiring and executing a control instruction associated with the hand part contour.

In addition, in order to achieve the above object, the present disclosure also provides a terminal device, which comprises: a memory, a processor, and an interactive control program stored on the memory and operable on the processor, wherein when the interactive control program is executed by the processor, the steps of the above interactive control methods are realized.

In addition, in order to achieve the above object, the present disclosure also provides a computer-readable storage medium having an interactive control program stored thereon, wherein when the interactive control program is executed by a processor, the steps of the above interactive control methods are realized.

The interactive control method, terminal device, and computer-readable storage medium proposed by the embodiments of the present disclosure, first acquire image data collected by the camera, then determine the current scene and control gestures according to the image data, and when the scene is a control scene corresponding to the terminal device, execute the control instruction corresponding to the control gesture. Since the terminal device can determine the current scene according to the collected image data, and only when the current scene is the control scene corresponding to itself, it responds to the control gesture and executes the corresponding control instruction. In this way, the false response phenomenon of the terminal device in a non-control scene is avoided, and the accuracy of control input detection of terminal devices that can be controlled by gestures, such as AR devices, is improved.

BRIEF DESCRIPTION OF DRAWINGS

The present invention will hereinafter be described in conjunction with the following drawing figures, wherein like numerals denote like elements, and.

Figure 1:
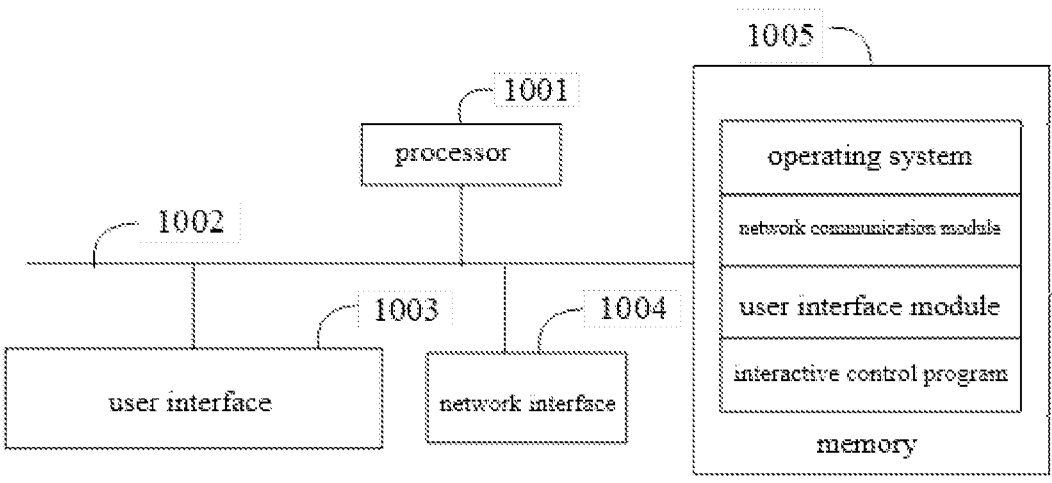
FIG. 1 is a schematic diagram of the terminal structure of the hardware operating environment involved in the solution of an embodiment of the present disclosure.

The realization of object, functional features and advantages of the present disclosure will be further described in combination with the embodiments and with reference to the accompanying drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It should be understood that the specific embodiments described here are only used to explain the present disclosure, not to limit the present disclosure.

With the development of technology, many devices are equipped with gesture control functions. Taking AR devices as an example, the most common control solution for AR devices is gesture control, that is, users can interact with AR devices through gestures to control the displayed content of AR devices. However, when the AR device is controlled by gestures, the AR device will execute the control commands corresponding to all the collected gestures, which often leads to the phenomenon of false identification in some application scenarios.

For example, the user can control the display of virtual objects in the display screen of the AR device through gestures. Specifically, the display position and displayed content of the virtual object can be controlled through gestures. In a specific application scenario, in some AR devices, when a preset gesture is received, a Win10 control interface may be displayed on the desktop or other objects in the AR screen. When a click operation on the virtual Win10 control interface is detected, the displayed content corresponding to the virtual Win10 interface in the AR screen is updated based on the click operation. In this way, the operation of displaying the virtual touch screen in the AR screen is achieved. However, when a user using an AR device simultaneously uses other electronic devices such as a mobile phone and a tablet computer, the AR device may mistakenly identify the user's gesture for controlling the other electronic device as the user's gesture for controlling the AR device.

As a result, the input detection solution of AR devices in the related technologies has the defect that the control input detection of AR devices is not accurate.

Of course, in gesture control scenarios of some other devices, it is easy to mistakenly identify the user's actions of turning lights on and off, using electronic products, etc. as control actions, which will not be enumerated here.

In order to solve the above problems, an embodiment of the present disclosure proposes an interactive control method, the main solution of which comprises:

acquiring image data collected by the camera;

determining a current scene and a control gesture according to the image data; and when the current scene is a control scene corresponding to the terminal device, executing a control instruction corresponding to the control gesture.

Since the terminal device can determine the current scene according to the collected image data, and only when the current scene is the control scene corresponding to itself, it responds to the control gesture and executes the corresponding control instruction. In this way, the false response phenomenon of the terminal device in a non-control scene is avoided, and the accuracy of control input detection of terminal devices that can be controlled by gestures, such as AR devices, is improved.

Referring to FIG. 1, which is a schematic diagram of the terminal structure of the hardware operating environment involved in the solution of an embodiment of the present disclosure.

As shown in FIG. 1, the terminal may comprise: a processor 1001, such as a CPU, a network interface 1004, a user interface 1003, a memory 1005, and a communication bus 1002. The communication bus 1002 is used to realize the connection and communication between these components. The user interface 1003 may include a display screen, an input unit such as a keyboard, a mouse, etc. Optionally, the user interface 1003 may further include a standard wired interface or a wireless interface. Optionally, the network interface 1004 may include a standard wired interface or a wireless interface (such as a WI-FI interface). The memory 1005 may be a high-speed RAM memory or a non-volatile memory, such as a magnetic disk memory. Optionally, the memory 1005 may also be a storage device independent of the above processor 1001.

Those skilled in the art can understand that the terminal structure shown in FIG. 1 does not constitute a limitation on the terminal, and the terminal may comprise more or fewer components than those shown in the FIG. 1, or be a combination of some components, or have different component arrangements.

As shown in FIG. 1, the memory 1005, as a computer storage medium, may comprise an operating system, a network communication module, a user interface module, and an interactive control program.

In the terminal shown in FIG. 1, the network interface 1004 is mainly used to connect to the background server and perform data communication with the background server. The processor 1001 may be used to call the interactive control program stored in the memory 1005, and perform the following operations:

acquiring image data collected by the camera;

determining a current scene and a control gesture according to the image data; and when the current scene is a control scene corresponding to the terminal device, executing a control instruction corresponding to the control gesture.

Further, the processor 1001 may call the interactive control program stored in the memory 1005, and also perform the following operations:

when the current scene is a scene other than the control scene, the terminal device ignores the control gesture, or performs at least one of the following:

displaying a prompt interface, wherein the prompt interface is used to set a type of the control gesture; and outputting a prompt message prompting a type of the control gesture.

Further, the processor 1001 may call the interactive control program stored in the memory 1005, and also perform the following operations:

identifying whether an electronic device is included in the image data;

determining whether the current scene is the control scene according to an identification result; and determining the control gesture according to the image data.

Further, the processor 1001 may call the interactive control program stored in the memory 1005, and also perform the following operations:

when the electronic device is included in the image data, determining whether a hand part in the image data overlaps with the electronic device; and when the hand part overlaps with the electronic device, defining the current scene as a scene other than the control scene.

Further, the processor 1001 may call the interactive control program stored in the memory 1005, and also perform the following operations:

acquiring brightness values corresponding to every pixel in the image data;

acquiring a contour corresponding to a display region in which the brightness values satisfy a preset condition; and when the contour is of a regular shape, determining that the electronic device is included in the image data.

Further, the processor 1001 may call the interactive control program stored in the memory 1005, and also perform the following operations:

collecting posture information and hand part information corresponding to the image data;

performing three-dimensional dense modeling according to the posture information and the hand part information to acquire three-dimensional point cloud information of the hand part in a reference coordinate system;

acquiring pose information of a virtual object in the image data in the reference coordinate system; and rendering the hand part and the virtual object based on the three-dimensional point cloud information of the hand part in the reference coordinate system and the pose information of the virtual object in the reference coordinate system, so as to execute the control instruction corresponding to the control gesture.

Further, the processor 1001 may call the interactive control program stored in the memory 1005, and also perform the following operations:

collecting an RGB image, a depth image and IMU data of the image data; and processing the RGB image, depth image and IMU data to acquire the posture information and the hand part information corresponding to the image data.

Further, the processor 1001 may call the interactive control program stored in the memory 1005, and also perform the following operations:

acquiring a hand part contour corresponding to the control gesture; and acquiring and executing a control instruction associated with the hand part contour.

Figure 2:
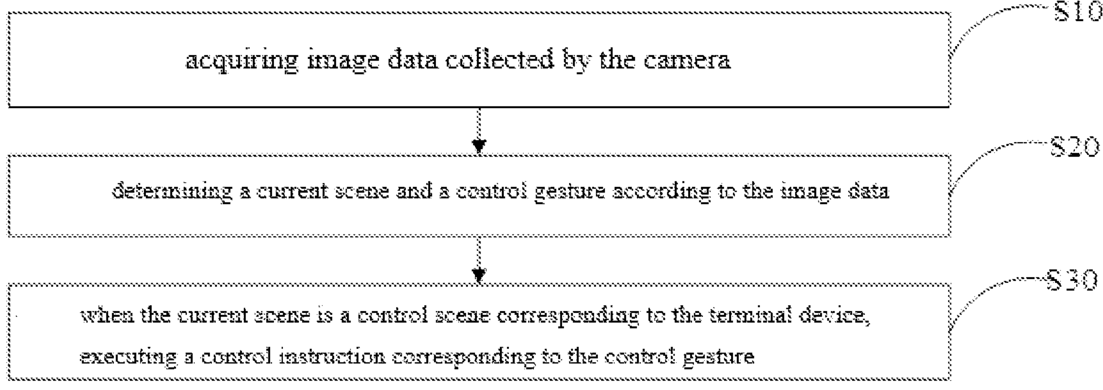
FIG. 2 is a schematic flow diagram of an embodiment of the interactive control method of the present disclosure.

Referring to FIG. 2, in an embodiment of the interactive control method of the present disclosure, the interactive control method comprises the steps of:

Step S10, acquiring image data collected by the camera;

Step S20, determining a current scene and a control gesture according to the image data; and Step S30, when the current scene is a control scene corresponding to the terminal device, executing a control instruction corresponding to the control gesture.

With the development of technology, many devices are equipped with gesture control functions. Taking AR devices as an example, the most common control solution for AR devices is gesture control, that is, users can interact with AR devices through gestures to control the displayed content of AR devices. However, when the AR device is controlled by gestures, the AR device will execute the control commands corresponding to all the collected gestures, which often leads to the phenomenon of false identification in some application scenarios.

For example, the user can control the display of virtual objects in the display screen of the AR device through gestures. Specifically, the display position and displayed content of the virtual object can be controlled through gestures. In a specific application scenario, in some AR devices, when a preset gesture is received, a Win10 control interface may be displayed on the desktop or other objects in the AR screen. When a click operation on the virtual Win10 control interface is detected, the displayed content corresponding to the virtual Win10 interface in the AR screen is updated based on the click operation. In this way, the operation of displaying the virtual touch screen in the AR screen is achieved. However, when a user using an AR device simultaneously uses other electronic devices such as a mobile phone and a tablet computer, the AR device may mistakenly identify the user's gesture for controlling the other electronic device as the user's gesture for controlling the AR device.

As a result, the input detection solution of AR devices in the related technologies has the defect that the control input detection of AR devices is not accurate.

Of course, in gesture control scenarios of some other devices, it is easy to mistakenly identify the user's actions of turning lights on and off, using electronic products, etc. as control actions, which will not be enumerated here.

In this embodiment, in order to solve the above problems, an interactive control method is proposed, aiming at improving the accuracy of control input detection of the gesture control solution.

In an optional implementation, the subject that executes the interactive control method is a terminal device, and the terminal device may be an electronic device that can be controlled by gestures, such as AR glasses, a smart home appliance, or a smart phone. The terminal device at least comprises an image acquisition unit. The image acquisition unit comprises a camera, through which image data including the user's hand part can be collected, so that the user's control gesture can be collected based on the image data.

In this implementation, the image data collected by the camera may be acquired first. It can be understood that, when a video is taken by the camera, each frame of the video can be regarded as a set of image data; when a picture is taken by the camera, each picture can be regarded as a set of images data.

Further, after the image data is acquired, the current scene may be determined based on the image data.

Example 1

In an AR control scenario, in order to avoid mistakenly identifying the user's actions on other electronic devices as control gestures, after the image data is acquired, it may be identified whether an electronic device is included in the image data, and then it is determined whether the current scene is the control scene according to the identification result. When the electronic device is not included in the image data, the current scene is defined as the control scene; when the electronic device is included in the image data, the current scene is defined as a scene other than the control scene.

Specifically, in the Example 1, after the image data is collected, the brightness values corresponding to every pixel in the image data may be acquired. It can be understood that, in this scenario, when the user operates another electronic device, the display screen of the electronic device will be lighted on. The corresponding brightness value of the lighted-on display screen in the image data will be different from the brightness values of other objects in the image data. That is, when there is an electronic device in the image data, the image data will include a more bright region with a regular contour. Therefore, the contour corresponding to the display region in which the brightness values satisfy a preset condition may be acquired, and when the contour is of a regular shape, it is determined that the electronic device is included in the image data.

It should be noted that the preset condition may be that the brightness value is greater than a preset threshold. The preset threshold can be set according to empirical values. Or, in another optional implementation, the preset condition may also be that the brightness value satisfies the luminance characteristic of the light source. The principle is that in the light data corresponding to the image data, the display screen of the electronic device is the light source, so the brightness values of its corresponding pixels satisfy the luminance characteristics of the light source, while other objects generally reflect light and do not satisfy the luminance characteristics of the light source.

Example 2

Figure 3:
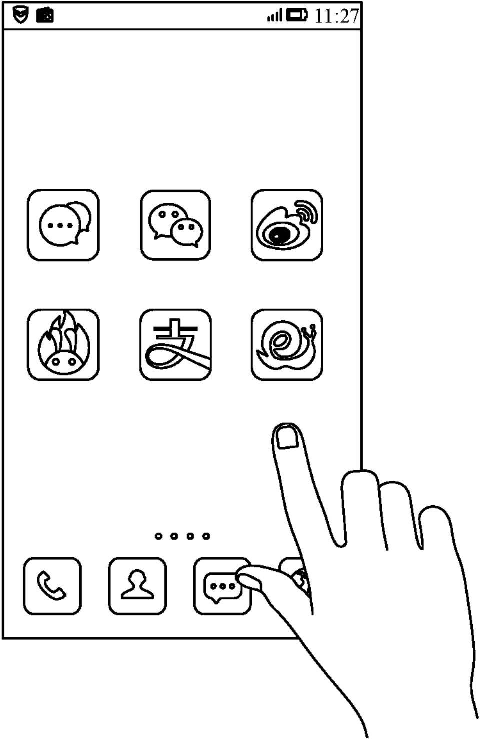
FIG. 3 is a schematic diagram of a positional relationship between an electronic device and a hand involved in an embodiment of the present disclosure.
Figure 4:
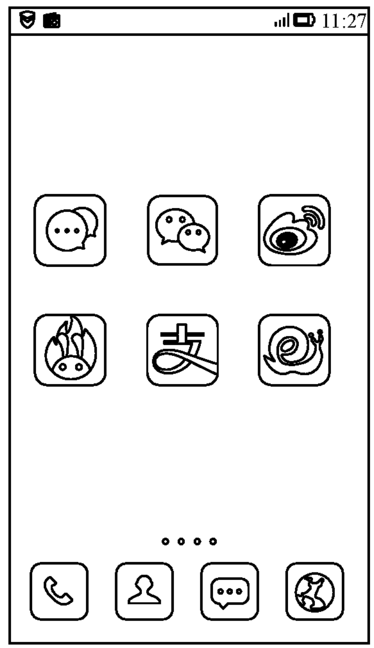
FIG. 4 is a schematic diagram of another positional relationship between an electronic device and a hand involved in an embodiment of the present disclosure.
Figure 4:
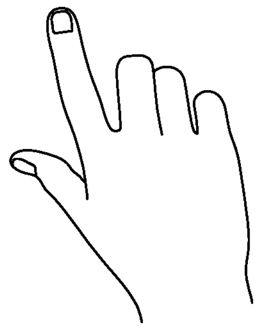

As an optional implementation, the Example 2 is based on the above Example 1. When the electronic device is included in the image data, if the current scene is directly defined as a scene other than the control scene, the reliability of scene judgment is low. In order to improve the accuracy of scene judgment, when the electronic device is included in the image data, it may first be determined whether the hand part in the image data overlaps with the electronic device. Referring to FIG. 3, when the hand part overlaps with the electronic device, the current scene is defined as a scene other than the control scene. Otherwise, referring to FIG. 4, when the hand part does not overlap the electronic device, the current scene is defined as the control scene. In this way, the accuracy of scene judgment is improved.

Example 3

In an application scenario, the terminal device is set to be a smart TV. After the image data is acquired, an image identification algorithm may be used to identify whether the hand part of the user in the image data coincides with the target object. The target object may be a light switch, a remote controller, and/or an electronic device, etc. Further, when the hand part coincides with the target object, the current scene is defined as a scene other than the control scene; otherwise it is defined as the control scene. In this way, the device can identify whether the current scene is a control scene or a user's daily life scene other than the control scene, such as turning off lights, using remote controls or electronic devices, etc., thereby preventing the device from identifying gestures in daily life scenes as control gestures.

Further, the control gesture may be determined according to the image data, and when the current scene is the corresponding control scene, a control instruction corresponding to the control gesture is executed.

Exemplarily, when the terminal device is an AR device, when determining the control gesture and executing the control instruction corresponding to the control gesture, the posture information and hand part information corresponding to the image data may be collected first; then, three-dimensional dense modeling is performed according to the posture information and the hand part information to acquire three-dimensional point cloud information of the hand part in a reference coordinate system, and the pose information of the virtual object in the image data in the reference coordinate system is acquired; and then, the hand part and the virtual object are rendered based on the three-dimensional point cloud information of the hand part in the reference coordinate system and the pose information of the virtual object in the reference coordinate system, so as to execute the control instruction corresponding to the control gesture.

When collecting the posture information and the hand part information corresponding to the image data, an RGB image, a depth image and IMU (Inertial Measurement Unit)

data of the image data may be collected first, and then the RGB image, depth image and IMU data are processed to acquire the posture information and the hand part information corresponding to the image data.

It can be understood that, in this example, each frame of video data may be used as the image data. Hereinafter, the image data will be described as a current frame. The RGB image, the depth image, and the corresponding IMU data of the current frame may be collected first, and then the RGB image and the IMU data are used as the output parameters of a preset SLAM model, the pose information of the current frame is acquired through the SLAM model, and the RGB image and the depth image are identified to acquire the hand part information. The hand part information includes hand contour information and hand depth information. Then, the pose information of the virtual object in the reference coordinate system is acquired, and the hand part and the virtual object are rendered based on the three-dimensional point cloud information of the hand part in the reference coordinate system, the pose information of the virtual object in the reference coordinate system, and the preset point cloud information of the virtual object, so as to acquire the occlusion relationship between the hand part and the virtual object.

In addition, in another example, the terminal device may be a smart earphone. When the smart earphone determines the control gesture according to the image data and executes the control instruction corresponding to the control gesture, it can directly acquire the hand part contour corresponding to the control gesture, acquire the control instruction associated with the hand part contour, and execute the control instruction. For example, the control instruction may be increasing volume, decreasing volume, and/or playing previous/next song, etc.

Optionally, in some embodiments, when it is determined that the current scene is a scene other than the control scene, the terminal device may directly ignore the control gesture.

The technical solution disclosed in this embodiment, first acquires image data collected by the camera, then determines the current scene and control gestures according to the image data, and when the scene is a control scene corresponding to the terminal device, executes the control instruction corresponding to the control gesture. Since the terminal device can determine the current scene according to the collected image data, and only when the current scene is the control scene corresponding to itself, it responds to the control gesture and executes the corresponding control instruction. In this way, the false response phenomenon of the terminal device in a non-control scene is avoided, and the accuracy of control input detection of terminal devices that can be controlled by gestures, such as AR devices, is improved.

Figure 5:
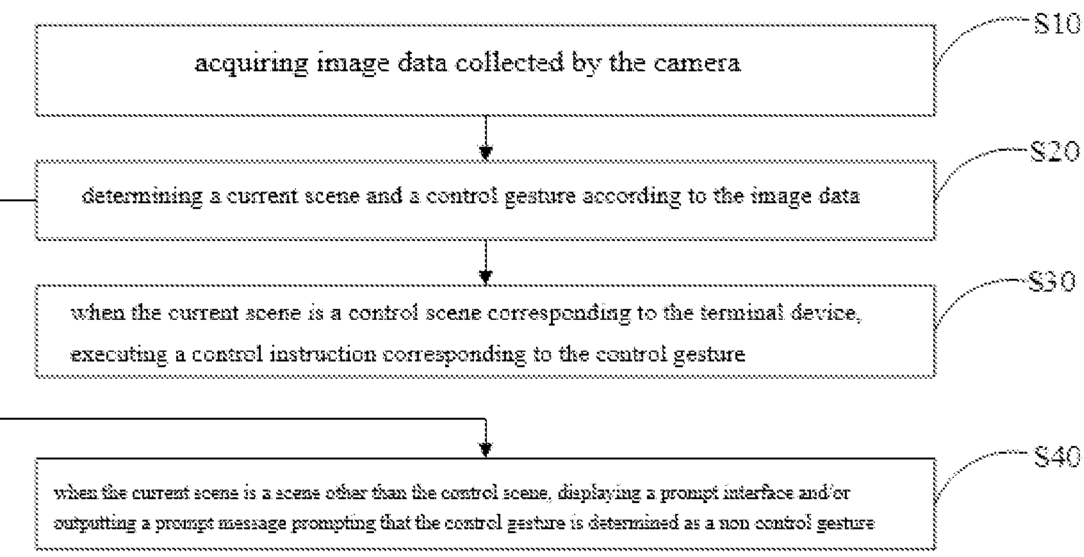
FIG. 5 is a schematic flowchart of another embodiment of the interactive control method of the present disclosure.

Optionally, referring to FIG. 5, based on the above embodiment, in another embodiment of the interactive control method of the present disclosure, after the step S20, the method further comprises:

Step S40, when the current scene is a scene other than the control scene, displaying a prompt interface and/or outputting a prompt message prompting the type of the control gesture.

In this embodiment, when the terminal device determines that the current scene is a scene other than the control scene, a prompt interface may be displayed. In the prompt interface, there is a gesture type selection button, so that the user can select the type of control gesture corresponding to the currently collected image data in the prompt interface. Specifically, the types may include legal control gestures and illegal control gestures. When the type of the control gesture corresponding to the image data is selected to be a legal control gesture by the user, the terminal device may be controlled to execute the control instruction corresponding to the control gesture. When the type of the control gesture is selected to be an illegal control gesture by the user, the control gesture is directly ignored, or a prompt message that the control gesture is determined to be a non-control gesture is displayed.

Alternatively, when the terminal device determines that the current scene is a scene other than the control scene, the control gesture is directly ignored, and a prompt message prompting the type of the control gesture is output to prompt the user that the terminal device will not respond to the control gesture.

In the technical solution disclosed in this embodiment, when the current scene is a scene other than the control scene, a prompt interface is displayed and/or a prompt message prompting the type of the control gesture is output. In this way, while the accuracy of control input detection of the terminal device is further improved, it is possible to avoid the phenomenon that when a scene identification error occurs, the user mistakenly thinks it as a transmission faulty of the terminal device and repeatedly controls, or mistakenly thinks that the terminal device is not sensitive to control.

In addition, an embodiment of the present disclosure also proposes a terminal device, which comprises: a memory, a processor, and an interactive control program stored on the memory and operable on the processor. When the interactive control program is executed by the processor, the steps of the interactive control methods described in the above embodiments are realized.

In addition, an embodiment of the present disclosure also proposes a computer-readable storage medium having an interactive control program stored thereon, wherein when the interactive control program is executed by a processor, the steps of the interactive control methods described in the above embodiments are realized.

It should be noted that, the terms "comprise", "include" or any other variants used herein are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or apparatus including the element.

The above serial numbers of the embodiments of the present disclosure are only for description and do not represent the priority order of the embodiments.

Through the above description of the embodiments, those skilled in the art can clearly understand that the methods of the embodiments can be implemented by means of software plus the necessary general hardware platform. Of course, it can also be implemented by hardware, but in many cases, the former is the better implementation method. Based on this understanding, the technical solution of the present disclosure, in essence or the part that contributes to the prior art, can be embodied in the form of a software product, which is stored on the above storage medium (such as ROM/RAM, magnetic disc, optical disc), and includes instructions to enable a mobile terminal to execute the method of each embodiment of the present disclosure.

The above only describes the preferred embodiments of the present disclosure, and is not intended to limit the scope of the patent of the present disclosure. All equivalent substitutions of structure or process made by using the contents of the description and drawings of the present disclosure, or direct or indirect applications in other related technical fields, shall all fall within the scope of protection scope of the present disclosure.

The following detailed description is merely exemplary in nature and is not intended to limit the invention or the application and uses of the invention. Furthermore, there is no intention to be bound by any theory presented in the preceding background of the invention or the following detailed description.

What is claimed is:

1. An interactive control method applied to a terminal device, wherein the terminal device comprises a camera, and when the terminal device is controlled by a control gesture, the interactive control method comprises the steps of:

acquiring image data collected by the camera;

identifying whether an electronic device other than the terminal device is included in the image data;

determining whether a current scene is the control scene according to an identification result, wherein the current scene is an active scene presently being displayed;

when the electronic device is included in the image data, determining whether a hand part in the image data overlaps with the electronic device;

when the hand part overlaps with the electronic device, defining the current scene as a scene other than the control scene, when the current scene is the scene other than the control scene, the terminal device ignores the control gesture;

determining the control gesture according to the image data; and when the current scene is a control scene corresponding to the terminal device, executing a control instruction corresponding to the control gesture, the control scene is used to control the terminal device to execute corresponding control instructions, wherein the step of identifying whether the electronic device is included in the image data comprises:

acquiring brightness values corresponding to every pixel in the image data:

acquiring a contour corresponding to a display region in which the brightness values satisfy a luminance characteristic of a light source; and when the contour is of a regular shape, determining that the electronic device is included in the image data.

2. The interactive control method according to claim 1, wherein, after the step of determining the current scene and the control gesture according to the image data, the method further comprises:

when the current scene is a scene other than the control scene, the terminal device ignores the control gesture, or performs at least one of the following:

displaying a prompt interface, wherein the prompt interface is used to set a type of the control gesture; and outputting a prompt message prompting a type of the control gesture.

3. A terminal device, comprising: a memory, a processor, and an interactive control program stored on the memory and operable on the processor, wherein when the interactive control program is executed by the processor, the steps of the interactive control method according to claim 2 is realized.

4. The interactive control method according to claim 1, wherein the terminal device is an augmented reality device, and the step of executing the control instruction corresponding to the control gesture comprises:

collecting posture information and hand part information corresponding to the image data;

performing three-dimensional dense modeling according to the posture information and the hand part information to acquire three-dimensional point cloud information of the hand part in a reference coordinate system;

acquiring pose information of a virtual object in the image data in the reference coordinate system; and rendering the hand part and the virtual object based on the three-dimensional point cloud information of the hand part in the reference coordinate system and the pose information of the virtual object in the reference coordinate system, so as to execute the control instruction corresponding to the control gesture.

5. The interactive control method according to claim 4, wherein the step of collecting the posture information and the hand part information corresponding to the image data comprises:

collecting an RGB image, a depth image and IMU data of the image data; and processing the RGB image, depth image and IMU data to acquire the posture information and the hand part information corresponding to the image data.

6. A terminal device, comprising: a memory, a processor, and an interactive control program stored on the memory and operable on the processor, wherein when the interactive control program is executed by the processor, the steps of the interactive control method according to claim 5 is realized.

7. A terminal device, comprising: a memory, a processor, and an interactive control program stored on the memory and operable on the processor, wherein when the interactive control program is executed by the processor, the steps of the interactive control method according to claim 6 is realized.

8. The interactive control method according to claim 1, wherein the terminal device is a smart earphone, and the step of executing the control instruction corresponding to the control gesture comprises:

acquiring a hand part contour corresponding to the control gesture; and acquiring and executing a control instruction associated with the hand part contour.

9. A terminal device, comprising: a memory, a processor, and an interactive control program stored on the memory and operable on the processor, wherein when the interactive control program is executed by the processor, the steps of the interactive control method according to claim 8 is realized.

10. A terminal device, comprising: a memory, a processor, and an interactive control program stored on the memory and operable on the processor, wherein when the interactive control program is executed by the processor, the steps of the interactive control method according to claim 1 is realized.

* * * * *